Figure 1:
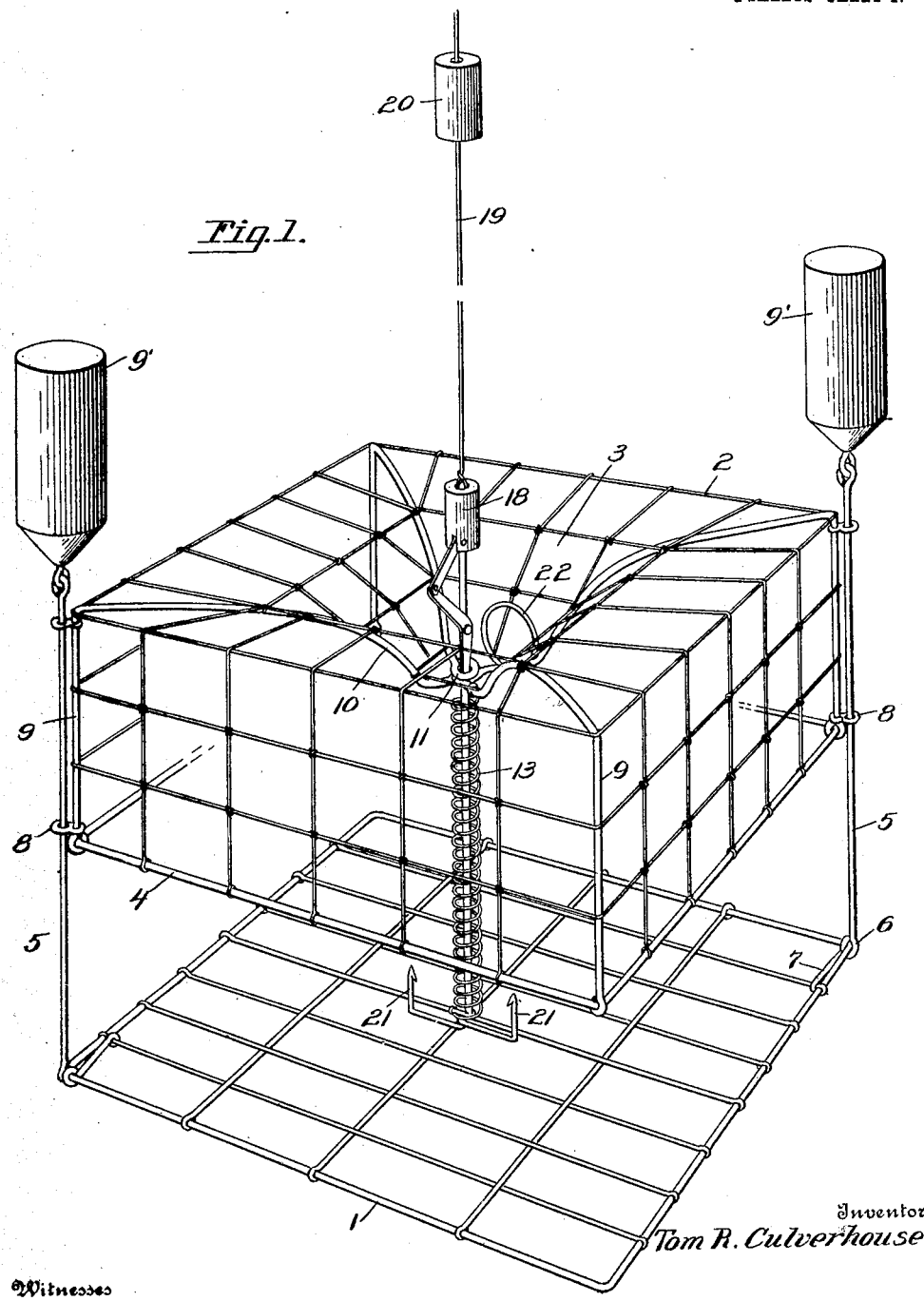

T. R. CULVERHOUSE.
TRAP.
APPLICATION FILED MAY 19, 1908.

916,677.

Patented Mar. 30, 1909.
2 SHEETS—SHEET 1.

Witnesses
F. C. Gibson.
P. M. Smith.

Inventor
Tom R. Culverhouse.

By Victor J. Evans
Attorney

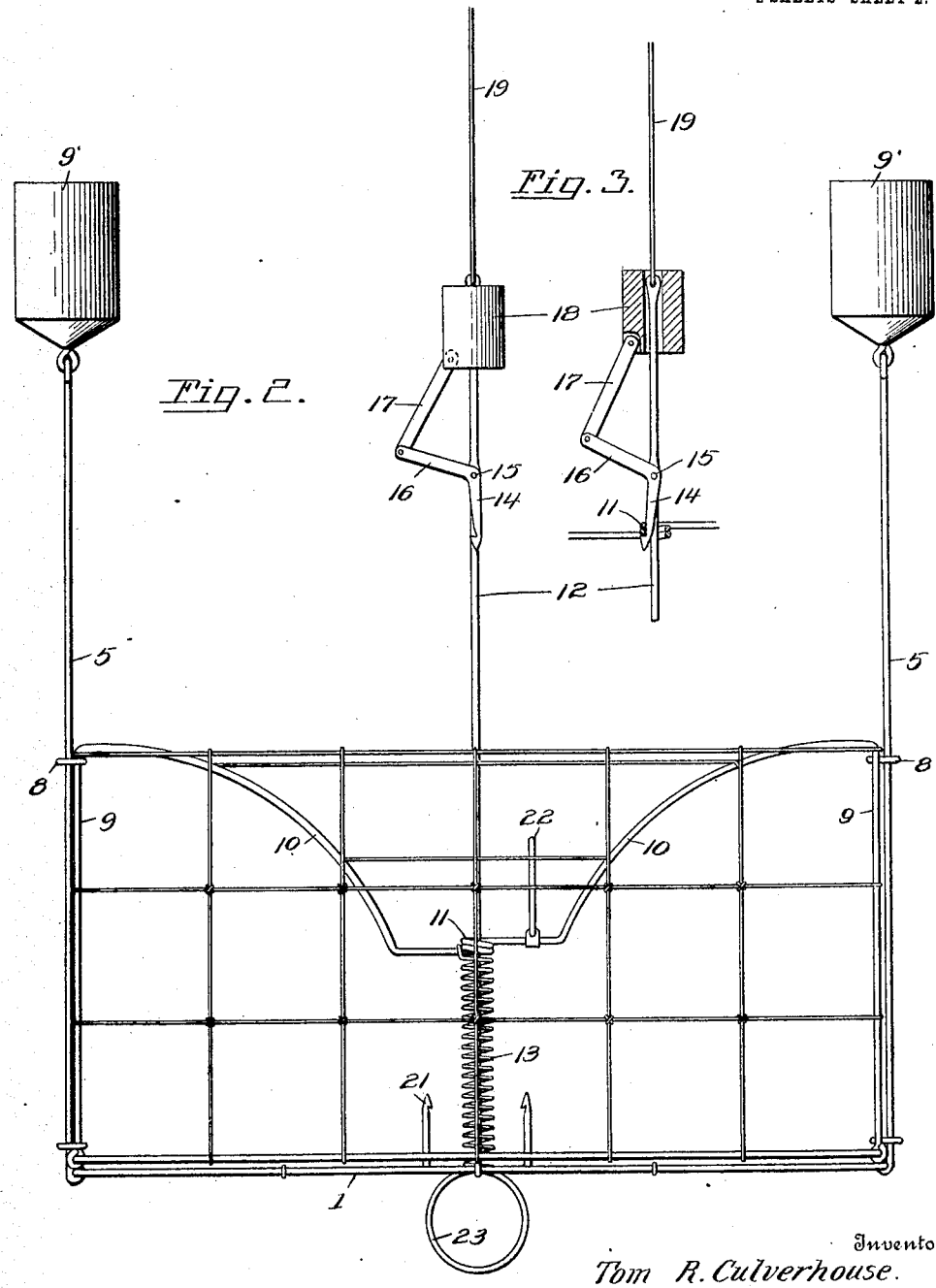

UNITED STATES PATENT OFFICE.

THOMAS R. CULVERHOUSE, OF REPUBLIC, ALABAMA, ASSIGNOR OF ONE-HALF TO J. W. COTTRELL, OF REPUBLIC, ALABAMA.

TRAP.

No. 916,677.        Specification of Letters Patent.       Patented March 30, 1909.

Application filed May 19, 1908. Serial No. 433,762.

*To all whom it may concern:*

Be it known that I, THOMAS R. CULVERHOUSE, a citizen of the United States, residing at Republic, in the county of Jefferson and State of Alabama, have invented new and useful Improvements in Traps, of which the following is a specification.

This invention relates to traps the object being to provide a trap especially designed for catching crabs, shell fish and the like embodying a cage having a movable part adapted to be tripped at an opportune moment for entrapping the crabs or shell fish and preventing the escape of the same while drawing the trap to the surface of the water.

With the above and other objects in view the invention consists in the novel construction, combination and arrangement of parts herein fully described, illustrated and claimed.

In the accompanying drawings Figure 1 is a perspective view of the complete trap showing the same set. Fig. 2 is a side elevation of the same showing the trap sprung. Fig. 3 is a detail section showing the catch which holds the trap set.

The trap contemplated in this invention is of reticulated, meshed or openwork construction and embodies in connection with a base 1, a cage 2 embodying a top which is centrally dished as shown at 3 and four vertically extending sides 4 so that when the cage rests on the bottom 1, the crabs or shell fish will be encaged and the escape of the same prevented.

Extending upward from diametrically opposite corners of the base or bottom 1 are guides 5 each of which is preferably formed of a suitable length of wire coiled around the marginal wire of one corner of the bottom 1 as shown at 6 and extended beyond the coil 6 as shown at 7 where it is wrapped around another portion of the bottom as shown in Fig. 1 so as to hold the guide 5 in a vertical position. The cage is provided with eyes or runners 8 which embrace the guides 5 and are movable up and down thereon. Connected to the upper extremities of the guides 8 are floats or buoys 9 which act to hold the cage in upright position and enable the same to be lowered to the bed of the stream so that the bottom 1 will rest on the bed of the stream.

In the preferred construction of the cage 2, I employ corner wires 9 which extend from the bottom marginal wire of the cage upward to the top edge thereof and then inward and downward as shown at 10 where they are formed with centrally located eyes 11 through which passes a centrally located rod 12, the lower end of which is connected centrally to the bottom 1 of the trap. The rod 12 also forms a guide for the movable cage 2 in addition to the guides 5 above referred to. Encircling said central rod 12 is a contractile spiral spring 13 the lower end of which is connected to the bottom 1 while the upper end thereof is connected to the movable cage 2, the tension of said spring being exerted to hold the cage closed with the upper movable section 2 thereof resting against the bottom 1. At the same time the spring 13 will yield to permit the upper portion of the cage to be moved upward in order to permit the L shaped catch 14 to pass through the eye or eyes 11 and sustain the upper section of the cage in an elevated or set position.

The catch 14 is pivotally mounted at its elbow as shown at 15 on the center rod 12 and the outward projecting arm 16 of the catch is connected by a pivotal link 17 to a slide 18 preferably in the form of a collar surrounding the rod 12 and having a limited sliding movement up and down thereon. Extending from the rod 12 upward is a hoisting and lowering line 19 upon which is threaded a trip or runner 20 in the form of a weight of suitable size and it will be noted that when the weight is allowed to run down the line 19, it will strike against the slide 18 and draw the latter downward so as to move the shoulder of the catch 14 out of engagement with the movable member of the cage, whereupon the spring 13 will throw said catching member quickly down against the bottom 1 thereby entrapping the crabs or fish.

Centrally of the bottom the cage is provided with a plurality of bait hooks 21 upon which suitable bait may be impaled to attract the crabs and fish. To provide for the convenient setting of the trap, setting rings 22 and 23 are secured respectively to the top and bottom sections of the cage so that before lowering the cage into the water, the operator may draw the top and bottom portions of the cage apart until an engagement is effected between the upper section of the cage and the holding catch 14.

Having described the invention I claim as new,

1. A sub-marine trap embodying a cage comprising relatively slidable members, means for giving said members a normal relative tendency toward each other, means for holding said members separated from each other, a line for raising and lowering the trap, and tripping means including a runner on said line for springing the trap.

2. A sub-marine trap embodying a cage comprising upper and lower relatively slidable members, guides connected with the lower member and having floats at the upper ends thereof, the upper member being mounted to slide on said guides, a catch for holding the upper cage member in an elevated position, and means for tripping said catch.

3. A sub-marine trap embodying a cage comprising upper and lower relatively slidable members, a centrally arranged guide rod connected to the lower member having the upper member mounted to slide thereon, a catch mounted on said rod and adapted to support the upper member in an elevated position, a line for raising and lowering the trap, and a runner on said line adapted to trip the catch.

4. A sub-marine trap embodying a cage comprising upper and lower relatively slidable members, a guide rod connected to the lower member and having the upper member slidably mounted thereon, a catch on said rod adapted to support the upper member in an elevated position, a slide connected to said catch, a line connected to said rod for raising and lowering the trap, and a runner on said line adapted to move the slide and trip the catch.

In testimony whereof I affix my signature in presence of two witnesses.

TOM. R. CULVERHOUSE.

Witnesses:
J. W. COTTRELL,
CHAS. L. CANSLER.